May 28, 1940.   M. H. GROVE   2,202,313
FLUID PRESSURE REGULATOR
Filed Nov. 10, 1937
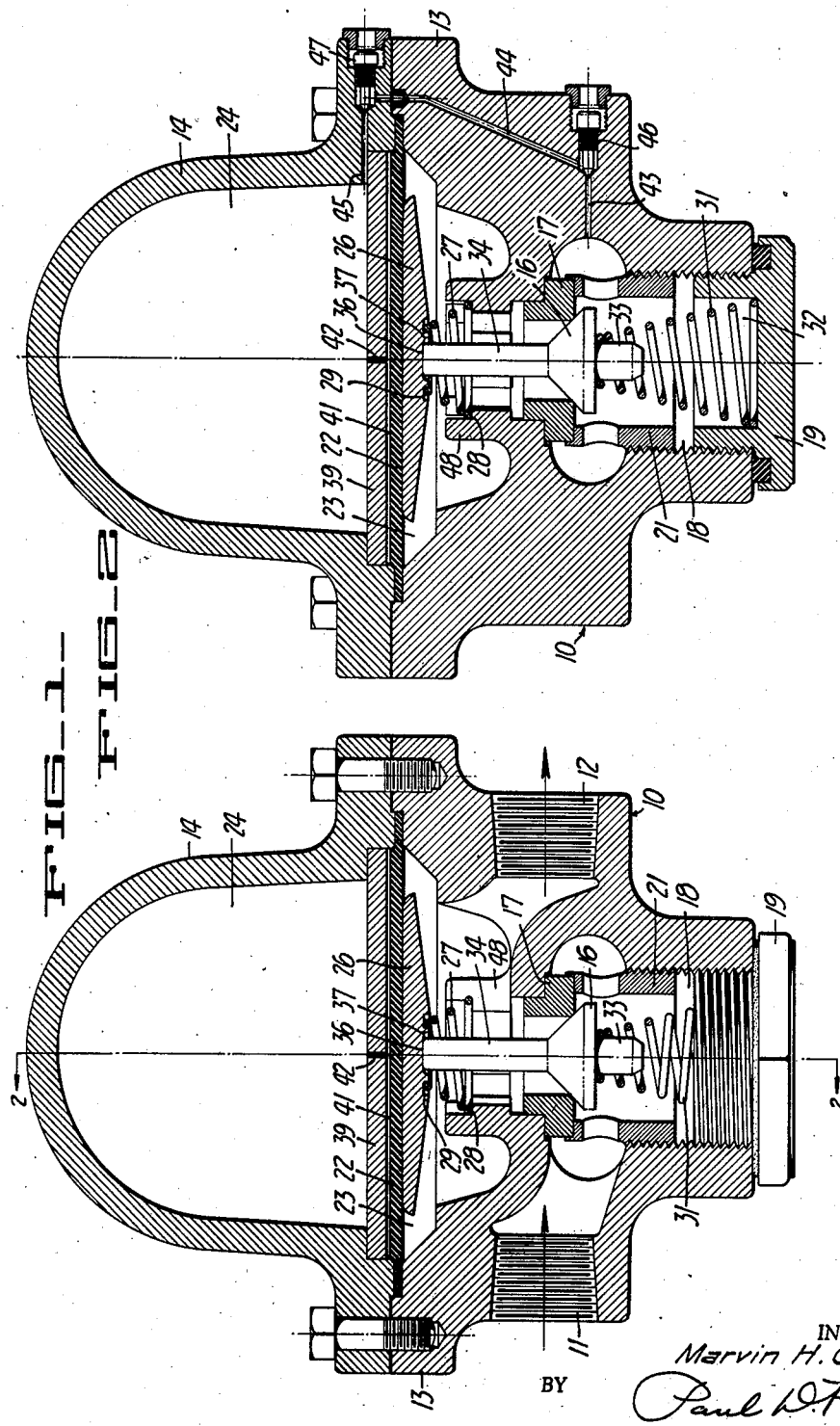
INVENTOR.
Marvin H. Grove
BY
ATTORNEY.

Patented May 28, 1940

2,202,313

UNITED STATES PATENT OFFICE 2,202,313

FLUID PRESSURE REGULATOR

Marvin H. Grove, Berkeley, Calif.

Application November 10, 1937, Serial No. 173,857

4 Claims. (Cl. 50—21)

This invention relates generally to devices for automatically regulating flow of fluid. In a typical example the invention is incorporated in a pressure regulator serving to supply fluid at a substantially constant pressure to a point of demand, from a relatively higher pressure source of fluid supply.

Fluid pressure regulators make practically universal use of valve members of the disc type, movable in opposite directions with respect to a cooperating valve seat. The valve member is usually carried by one end of a valve stem, which in turn is guided within a suitable bushing, and which is connected to a fluid pressure operated diaphragm or a piston. I have found that where a pressure regulator is constructed in such a manner as to otherwise give a high degree of sensitivity, as for example in accordance with the teachings of my Patent No. 2,047,101, the guide bushing for the valve stem must be constructed with considered care, to avoid friction. Friction causes a loss in sensitivity and accuracy, and may result in failure to effect the desired regulation. The provision of a guide bushing involves considerable expense, not only because of the parts involved, but also because these parts require accurate machining and fitting, in order to insure proper alignment. Even when accurately fitted and machined to afford a minimum of friction, the bushing tends to prevent self-alignment of the valve member, which under certain circumstances is desirable, and foreign solids may find their way between the bushing and the stem, to interfere with free movement of the stem.

It is an object of the present invention to devise a simple form of pressure regulator in which surfaces such as afforded by bushings, for guiding the valve member, are omitted in entirety. This is made possible by the use of an assembly serving to maintain proper alignment of the working parts without the use of definite guiding surfaces.

A further object of the invention is to provide a fluid pressure regulator of the gas pressure loaded type, having the features of the regulator disclosed and claimed in my Patent No. 2,047,101, and at the same time being characterized by utmost simplicity and absence of frictional resistance to movements of the valve member.

Further objects of the invention will appear from the following description in which the preferred embodiment of the invention has been set forth in detail in conjunction with the accompanying drawing.

Referring to the drawing:

Fig. 1 is a side elevational view, in cross section, illustrating a regulator incorporating the present invention.

Fig. 2 is a cross sectional detail taken along the line 2—2 of Fig. 1.

The regulator illustrated in the drawing consists of a body 10, provided with inflow and outflow openings 11 and 12. One side face of this body is provided with an annular flange 13, upon which is clamped the pressure dome 14. Within the valve body there is a valve member 16, cooperating with the removable seat ring 17. In order to facilitate replacement of the seat ring 17, and also removal and replacement of the valve member, the lower side of the body is provided with a threaded bore 18, which is normally closed by a cap or plug 19. A ported sleeve 21 is threaded into bore 18, and has its upper end engaging the lower face of seat ring 17.

The fluid pressure operated member is in the form of a flexible diaphragm 22, the peripheral edge portion of which is shown clamped between opposed annular faces of the body and dome 14. Beneath the diaphragm 22 there is a chamber 23, which has free communication with the outflow opening 12. On the other side of the diaphragm 22 there is a closed gas chamber 24 formed by the dome 14, and adapted to contain a predetermined amount of gas under pressure. The flexible diaphragm 22 is made of suitable material, such as resilient vulcanized rubber, or synthetic rubber like Duprene.

One side of the diaphragm 22 is engaged by the relatively rigid metal thrust disc 26. In order to continuously urge this disc into contact with the diaphragm, and also to maintain its proper alignment, a compression spring 27 is provided. This spring is conical shaped as illustrated, and has its large end seated upon the circumferentially disposed ledges 28, and its smaller end seated within the annular groove or recess 29, provided upon the thrust disc 26.

The valve member 16 is also continuously urged towards its seat ring 17, by a small compression spring 31. This compression spring is also conical shaped, and has its large end seated within the socket 32, provided in the closure 19. The upper end of spring 31 embraces a short stud 33, which extends from the valve member 16, and which is generally aligned with respect to the axis of the valve. Extending from the other side of the valve member 16 there is a valve stem 34, which is also aligned with respect to the axis of the valve member. The upper end of the valve stem 34 has simple abutting engagement with the central surface area 36, of the disc 26. It is desirable to have the surface 36 formed as the bottom of a recess 37, this recess being circular in contour and substantially larger in diameter than the diameter of the stem 34. Thus no positive restraint is imposed by thrust disc 26 upon limited lateral movements of the valve stem 34, except restraint imposed against movements sufficient to bring the upper end of stem 34 into engagement with the sides of recess 37.

In accordance with the teachings of said Patent 2,047,101, a pneumatic type of restraint is afforded for movements of the diaphragm 22, in order to prevent chattering or slapping of the valve member against its seat. Thus a rigid baffle wall 39 is provided, which is mounted upon the dome 14, and which extends parallel and in relatively close proximity to the adjacent face of diaphragm 22. A relatively small clearance or space 41 is afforded between the baffle wall 39 and diaphragm 22, corresponding to the position of the diaphragm for closed position of the valve member. In typical instances this clearance or space may be of the order of $\frac{1}{32}$ of an inch, for a valve travel of $\frac{1}{4}$ or $\frac{3}{8}$ of an inch. The space 41 is in restricted communication with chamber 24, through the flow restricting orifice 42. In the typical instance referred to above, orifice 42 may be of the order of 0.052 inch.

In order to adjust the gas pressure in chamber 24, ducts 43, 44 and 45 are shown, controlled by needle valves 46 and 47. By opening both these needle valves, gas can be bled from the inflow side of the regulator into the dome 14, until a predetermined loading pressure has been attained, as indicated by a pressure gauge on the outflow side. To reduce the pressure needle valve 46 may remain closed, and gas permitted to escape by opening needle valve 47.

The characteristic feature of the regulator described above, is that valve stem 34 does not engage with any bushing, such as conventionally used in regulators of the prior art. There is a free space about the stem 34, and the only physical contacts established with respect to the valve member are by virtue of the conical shaped compression spring 31, and the simple abutting engagement of the upper end of the valve stem with the thrust plate 26. The portions 48 of the body play no part in contacting or engaging the valve stem or valve member, but are in the form of spaced lugs, which form the supporting ledges 28 for the compression spring 27, and which may also serve as stops to engage and limit downward movement of the thrust plate 26.

Operation of the regulator described above, can be explained as follows:—Assume that the inflow opening 11 is connected to a source of gas under pressure, and that the outflow side 12 is connected to a point of gas demand, where it is desired to maintain the pressure at a given value, independent of the rate of demand, and independent of pressure variations upon the inflow side. The pressure in chamber 24 is set by the operator to afford the outflow pressure desired. Since the chamber 23 underneath the diaphragm 22 is in communication with the outflow side, any lowering of the outflow pressure below the value desired causes the pressure in chamber 24 to exceed the pressure in chamber 23, with the result that the diaphragm 22 is forced downwardly by the differential fluid pressure, to move the valve member 16 towards open position, or to move it open to a further extent, dependent upon the conditions of operation. The disc 26 will be retained in substantial alignment by virtue of the conical shaped compression spring 27. The valve member 16, and its stem 34 will also be retained in substantial alignment with respect to the axis of the seat ring, because of the action of the conical spring 31. Thus although in operation the valve member may shift laterally a limited amount, no friction will be imposed upon its movements towards open or closed positions, and the degree of alignment maintained by the compression spring 31 will cause the valve member to at all times seat properly upon the ring 17, to afford a tight closure. The simple abutting engagement between the upper end of stem 34 and the central surface 36 of disc 26, is sufficient to transmit proper motion between the diaphragm and the valve member, while at the same time permitting some self-aligning action of the valve member and stem, and permitting quick removal of the valve member upon removing the closure 19. The virtually guideless type of construction afforded works well with gas pressure loading and a pneumatic restraint such as afforded by baffle wall 39, because in this type of regulator there is substantially no damping for intermediate and full open positions of the valve member, and thus the absence of friction enhances sensitivity in responding to changes in gas flow or in the outflow pressure.

The regulator described will function properly over a wide variety of inflow and outflow pressures. With a diaphragm about 7¼ inches in diameter, an opening through the seat ring of about 1½ inches, and with a dimensioning previously mentioned herein by way of example, the inflow pressure may vary from 5 to 500 lbs. per square inch, and the outflow pressure from 1 lb. to any pressure slightly lower than the inflow pressure.

I claim:

1. In a fluid pressure regulator, a body having inflow and outflow openings, an annular valve seat formed within the body, a valve member cooperating with the valve seat and movable in opposite directions between open and closed positions, movements of said valve member serving to control flow of fluid through the body, a valve stem secured to the valve member and extending in substantial alignment with respect to the axis of the valve seat, a fluid pressure operated member having abutting engagement with the free end of the valve stem, said valve stem being otherwise free from contact with parts serving to retain the same in aligned position, and a substantially conical spring means serving to urge the valve member towards its seat and also serving to generally retain the valve member aligned with respect to its seat.

2. In a fluid pressure regulator, a body having inflow and outflow openings, an annular valve seat formed within the body, a valve member cooperating with the valve seat and movable in opposite directions between open and closed positions, movements of said valve member serving to control flow of fluid through the body, a flexible fluid pressure operated diaphragm, a relatively rigid disc engaging one side of said diaphragm, said diaphragm and said disc extending generally at right angles to the axis of said stem, the free end of said stem having abutting engagement with the central portion of said disc, spring means serving to urge the valve member towards its seat and also serving to retain the valve member generally aligned with respect to said seat, said valve stem being entirely out of physical contact with guiding surfaces, and spring means surrounding a portion of said valve stem and serving to urge said disc toward said diaphragm and also serving to retain said disc generally aligned with respect to the axis of said valve seat.

3. In a fluid pressure regulator, a body having inflow and outflow openings, an annular valve seat formed within the body, a valve member cooperating with the valve seat and movable in opposite directions between open and closed positions, movements of said valve member serving to control flow of fluid through the body, a valve stem secured to the valve member, a flexible fluid pressure operated diaphragm, a relatively rigid thrust disc engaging one side of said diaphragm, said diaphragm and said disc extending generally at right angles to said valve stem, the free end of said valve stem having abutting engagement with the other side of said thrust disc, said valve stem being generally aligned with respect to the axis of said valve seat and being out of physical contact with the guiding surfaces, and a substantially conical shaped spring having its smaller end engaging said valve member and its larger end seated upon a portion of the valve body, the axis of said spring being generally aligned with respect to the axis of the valve seat, said spring serving to urge the valve member towards said seat and also serving to generally retain the valve member aligned with respect to the axis of the valve seat.

4. In a fluid pressure regulator, a body having inflow and outflow openings, an annular valve seat formed within the body, a valve member cooperating with the valve seat and movable in opposite directions between open and closed positions, movements of said valve member serving to control flow of fluid through the body, a valve stem secured to one side of the valve member and adapted to be disposed in general alignment with the axis of the valve seat, a fluid pressure operated diaphragm carried by the body, a relatively rigid thrust disc engaging one side face of the diaphragm, said diaphragm and said disc extending generally at right angles to the axis of the valve seat adjacent the free end of the valve stem, the free end of the valve stem having abutting engagement with the central portion of said disc, said valve stem being substantially free from physical contact with the guiding surfaces, a substantially conical shaped compression spring serving to urge the thrust disc in a direction towards said diaphragm, said spring having its axis aligned with respect to the axis of the valve seat and having its larger end seated upon the valve body and its smaller end seated upon the thrust disc on an annular area surrounding the free end of the valve stem, and a substantially conical shaped compression spring serving to urge the valve member towards its seat, said latter compression spring having its axis generally aligned with respect to the axis of the valve seat, and having its larger end seated upon the valve body, and its smaller end seated upon the valve member.

MARVIN H. GROVE.